(12) United States Patent
Göransson et al.

(10) Patent No.: US 10,960,546 B2
(45) Date of Patent: Mar. 30, 2021

(54) SHEAR PIN FOR ROBOT CALIBRATION

(71) Applicant: ABB Schweiz AG, Baden (CH)

(72) Inventors: Andreas Göransson, Västerås (SE); Peter Fixell, Västerås (SE); Siim Viilup, Tallinn (EE); Stefan Danielsson, Västerås (SE); Sven Hanssen, Västerås (SE); Hans Andersson, Västerås (SE); Mats Olsson, Västerås (SE)

(73) Assignee: ABB Schweiz AG, Baden (CH)

( * ) Notice: Subject to any disclaimer, the term of this patent is extended or adjusted under 35 U.S.C. 154(b) by 576 days.

(21) Appl. No.: 15/762,307

(22) PCT Filed: Oct. 16, 2015

(86) PCT No.: PCT/EP2015/074019
§ 371 (c)(1),
(2) Date: Mar. 22, 2018

(87) PCT Pub. No.: WO2017/063711
PCT Pub. Date: Apr. 20, 2017

(65) Prior Publication Data
US 2018/0272536 A1     Sep. 27, 2018

(51) Int. Cl.
*B25J 9/16*     (2006.01)
*F16B 19/02*     (2006.01)
(Continued)

(52) U.S. Cl.
CPC ............ *B25J 9/1692* (2013.01); *B25J 19/00* (2013.01); *B25J 19/0095* (2013.01); *B25J 19/065* (2013.01); *F16B 19/02* (2013.01); *F16B 31/021* (2013.01); *G05B 2219/39024* (2013.01); *Y10S 901/49* (2013.01)

(58) Field of Classification Search
CPC ................................ F16B 31/021; F16B 19/02
See application file for complete search history.

(56) References Cited

U.S. PATENT DOCUMENTS

| | | | | |
|---|---|---|---|---|
| 1,018,741 A | * | 2/1912 | Davis | A62C 35/605 411/390 |
| 3,174,385 A | * | 3/1965 | Hallowell, Jr. | F16B 39/284 411/2 |

(Continued)

FOREIGN PATENT DOCUMENTS

| | | |
|---|---|---|
| CN | 2545384 Y | 4/2003 |
| CN | 200992719 Y | 12/2007 |

(Continued)

OTHER PUBLICATIONS

Chinese Office Action; Application No. 2015800832250; dated Jul. 28, 2020; 4 pages.

(Continued)

*Primary Examiner* — Jonathan P Masinick
(74) *Attorney, Agent, or Firm* — Whitmyer IP Group LLC

(57) ABSTRACT

A shear pin for calibrating an industrial robot, the shear pin including an elongated body including a weakening defining a break location in case of overload. The shear pin is configured to be mounted to a calibration pin holder on the robot. A maximum force that the calibration pin can exert on the robot during calibration can be easily limited by dimensioning the weakening appropriately.

10 Claims, 1 Drawing Sheet

(51) Int. Cl.
  *F16B 31/02* (2006.01)
  *B25J 19/00* (2006.01)
  *B25J 19/06* (2006.01)

(56) References Cited

U.S. PATENT DOCUMENTS

| | | | | |
|---|---|---|---|---|
| 3,512,447 | A * | 5/1970 | Vaughn | F16B 31/021 411/5 |
| 4,557,661 | A | 12/1985 | Fischer et al. | |
| 4,720,204 | A * | 1/1988 | Johnson | E04H 12/32 285/2 |
| 7,424,996 | B2 | 9/2008 | Larsen | G01L 5/101 116/212 |
| 7,748,936 | B2 * | 7/2010 | Schneider | F16B 9/056 411/5 |
| 8,136,766 | B2 * | 3/2012 | Dennis | F16B 41/002 244/199.4 |
| 8,398,345 | B2 * | 3/2013 | Pratt | F16B 31/021 411/39 |
| 8,875,368 | B2 * | 11/2014 | O'Sullivan | F16B 31/00 29/426.2 |
| 9,140,286 | B2 * | 9/2015 | Dent | F16B 31/021 |
| 9,689,421 | B2 * | 6/2017 | Ulrich | F16B 37/08 |
| 9,952,129 | B2 * | 4/2018 | Kondo | H01H 35/006 |
| 10,006,480 | B2 * | 6/2018 | Bier | F16B 31/021 |
| 10,336,604 | B2 * | 7/2019 | Clever | B67D 7/40 |
| 10,598,206 | B2 * | 3/2020 | Bier | F16B 31/021 |
| 2006/0171774 | A1 * | 8/2006 | Chaumette | F16B 31/021 403/41 |
| 2008/0289443 | A1 | 11/2008 | Iwai et al. | |

FOREIGN PATENT DOCUMENTS

| | | | |
|---|---|---|---|
| EP | 194739 A2 | 9/1986 | |
| EP | 1367269 A1 * | 12/2003 | F16B 31/021 |
| EP | 1743745 A1 | 1/2007 | |
| FR | 2615586 A1 | 11/1988 | |
| JP | S5769109 A | 4/1982 | |
| JP | H0557649 A | 3/1993 | |
| JP | H07133820 A | 5/1995 | |
| JP | 2009255198 A | 11/2009 | |
| JP | 2010089213 A | 4/2010 | |
| JP | 2011128050 A | 6/2011 | |
| WO | 2015064392 A1 | 5/2015 | |
| WO | 2015064932 A1 | 5/2015 | |

OTHER PUBLICATIONS

Internation Search Report and Written Opinion of the International Searching Authority Application No. PCT/EP2015/074019 dated Jul. 4, 2016; Completed: Jun. 24, 2016 12 pages.

* cited by examiner

SHEAR PIN FOR ROBOT CALIBRATION

TECHNICAL FIELD

The present invention relates to calibration tools for calibrating an industrial robot.

BACKGROUND

It is conventionally known to mount a calibration pin to a calibration pin holder on an industrial robot during calibration of the robot. A typical calibration pin is a cylindrical steel pin. JP2010089213 discloses a cylindrical calibration pin.

During calibration a calibration pin is brought into contact with a counterpart by moving the robot. Conventional calibration pins have the drawback that if an excessive force or speed is used in moving the robot when the calibration pin comes into contact with a counterpart, the robot may be damaged.

SUMMARY

One object of the invention is to provide an improved calibration pin.

These objects are achieved by the device according the different aspects of the invention.

The invention is based on the realization that a maximum force that a calibration pin can exert on a robot during calibration can be easily limited by providing the calibration pin with an appropriate weakening.

According to a first aspect of the invention, there is provided a shear pin for calibrating an industrial robot. The shear pin comprises an elongated body comprising a weakening defining a break location in case of overload. The shear pin is configured to be mounted to a calibration pin holder on the robot.

According to one embodiment of the invention, the weakening comprises a waist having a narrower dimension compared to an overall shape of the body.

According to one embodiment of the invention, the break location is covered with a protection preventing shatter when the shear pin breaks.

According to one embodiment of the invention, the body has a cylindrical contact part that in use is configured to come into contact with a counterpart.

According to one embodiment of the invention, the body has a cylindrical mounting part that is configured to be inserted into the calibration pin holder.

According to one embodiment of the invention, the mounting part further comprises a groove on outer surface of the same, and a spring in the groove for keeping the shear pin in place within the calibration pin holder.

According to one embodiment of the invention, the body is made of hardened steel.

According to one embodiment of the invention, the shear pin further comprises a core within the body, the core material being softer than the body material.

According to one embodiment of the invention, the core comprises a collar at each side of the weakening in a longitudinal direction of the shear pin.

According to one embodiment of the invention, the weakening is dimensioned to break to protect the robot.

According to a second aspect of the invention, there is provided an industrial robot comprising a shear pin according any of the embodiments disclosed hereinbefore.

BRIEF DESCRIPTION OF THE DRAWINGS

The invention will be explained in greater detail with reference to the accompanying drawings, wherein.

DETAILED DESCRIPTION

Figure 1:
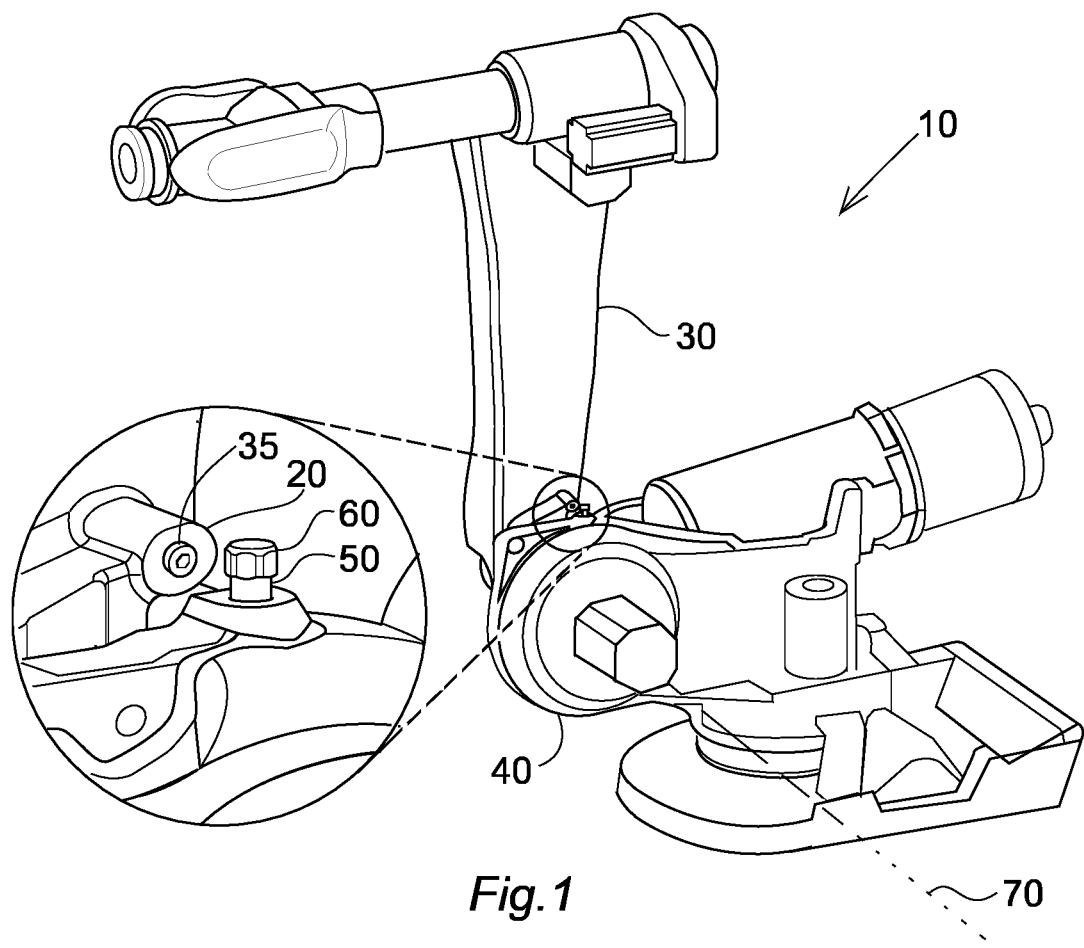
FIG. 1 shows an industrial robot with a calibration pin holder.

Referring to FIG. 1, an industrial robot 10 comprises a calibration pin holder 20 in the form of a cylindrical bushing on a lower arm 30. In FIG. 1 the bushing is protected with a plug 35. A robot frame 40 comprises a counterpart 50 that in FIG. 1 is protected with a cap 60. The lower arm 30 is rotatable in relation to the robot frame 40 about an axis 70. During normal use of the robot 10 the calibration pin holder 20 can freely pass by the counterpart 50 when the lower arm 30 is rotated about the axis 70. In order to carry out calibration of the robot 10 the plug 35 and the cap 60 are removed, and a calibration pin (not shown) is inserted into the bushing. Consequently, the calibration pin holder 20 can no longer pass by the counterpart 50 but the calibration pin collides with it when the lower arm 30 is rotated about the axis 70. During the calibration the calibration pin is brought into contact with the counterpart 50.

Figure 2:
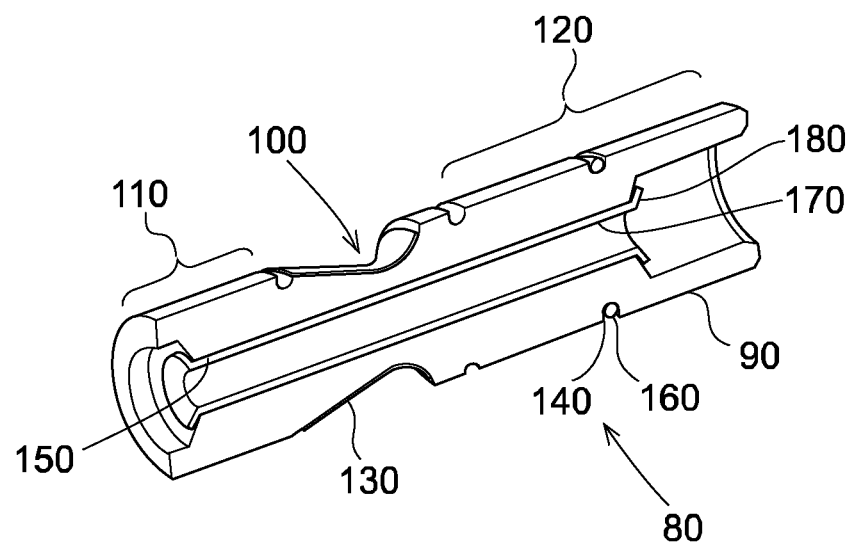
FIG. 2 shows one embodiment of the invention.

Referring to FIG. 2, a shear pin 80 according to the invention comprises a body 90 with cylindrical parts 110, 120 and a waist 100. At one distal end the body 90 has a cylindrical contact part 110 that in use is configured to come into contact with a counterpart 50 according to FIG. 1. At the opposite distal end the body 90 has a cylindrical mounting part 120 that is configured to be inserted into a calibration pin holder 20 according to FIG. 1. The body 90 is made of hardened steel. The cylindrical parts 110, 120 have a diameter of 10 mm while the waist 100 has a minimum diameter of 6 mm. The waist 100 thereby forms a weakening defining a break location in case of overload of the shear pin 80. The waist 100 is covered with a rubber coating 130. The body 90 furthermore comprises a groove 140 at the mounting part 120, and a through hole 150 in a longitudinal direction. A spring loaded steel ring 160 is mounted in the groove 140, and within the through hole 150 there is a core 170 in the form of a brass tube which is attached to the body 90 by means of a collar 180 at each end.

In use the shear pin 80 is mounted e.g. to the calibration pin holder 20 of FIG. 1 by inserting it into the bushing such that the steel ring 160 is inside of the bushing. The steel ring 160 presses against inner walls of the bushing keeping the shear pin 80 in place. The waist 100 and the contact part 110 are outside of the bushing, and the contact part 110 comes into contact with the counterpart 50 on the robot frame 40. If the force exerted on the contact part 110 exceeds a break limit, the body 90 breaks at a break location at the waist 100. The rubber coating 130 functions as a protection preventing shatter from the body material when it breaks. The core 170 keeps the body parts on opposite sides of the break location together even after breaking, thereby absorbing energy and preventing the contact part 110 from flinging off in a potentially dangerous manner. The core 170 will eventually also break if the counterpart 50 displaces the contact part 110 sufficiently.

The waist 100 is dimensioned to break with a breaking force that is too small for causing any damages to the robot 10. The waist 100 thereby breaks to protect the robot 10 from damages in a situation where an excessive force or speed is used in moving the robot 10 when the shear pin 80 comes into contact with the counterpart 50.

The invention is not limited to the embodiments shown above, but the person skilled in the art may modify them in a plurality of ways within the scope of the invention as defined by the claims. Thus, the invention may, for example, be applied at any axis of a robot 10.

The invention claimed is:

1. A shear pin for calibrating an industrial robot and configured to be mounted to a calibration pin holder on the robot, the shear pin comprising:
    an elongated body comprising a weakening defining a break location in case of overload,
    characterized in that the break location is covered with a protection preventing shatter when the shear pin breaks.

2. The shear pin according to claim 1, wherein the weakening comprises a waist having a narrower dimension compared to an overall shape of the body.

3. The shear pin according to claim 1, wherein the body has a cylindrical contact part that in use is configured to come into contact with a counterpart.

4. The shear pin (80) according to claim 1, wherein the body has a cylindrical mounting part that is configured to be inserted into the calibration pin holder.

5. The shear pin according to claim 4, wherein the mounting part further comprises a groove on outer surface of the same, and a spring in the groove for keeping the shear pin (80) in place within the calibration pin holder.

6. The shear pin according to claim 1, wherein the body is made of hardened steel.

7. The shear pin according to claim 1, wherein the shear pin further comprises a core within the body, the core material being softer than the body material.

8. The shear pin according to claim 7, wherein the core comprises a collar at each side of the weakening in a longitudinal direction of the shear pin.

9. The shear pin according to claim 1, wherein the weakening is dimensioned to break to protect the robot.

10. An industrial robot comprising a shear pin and configured to be mounted to a calibration pin holder on the robot, the shear pin comprising:
    an elongated body comprising a weakening defining a break location in case of overload,
    characterized in that the break location is covered with a protection preventing shatter when the shear pin breaks.

* * * * *